July 6, 1954
C. W. BERTHIEZ
2,682,698
AUXILIARY TOOL HEAD ADAPTABLE TO MILLING AND
BORING MACHINES OR LIKE MACHINE TOOLS
Filed Dec. 9, 1949
2 Sheets-Sheet 1
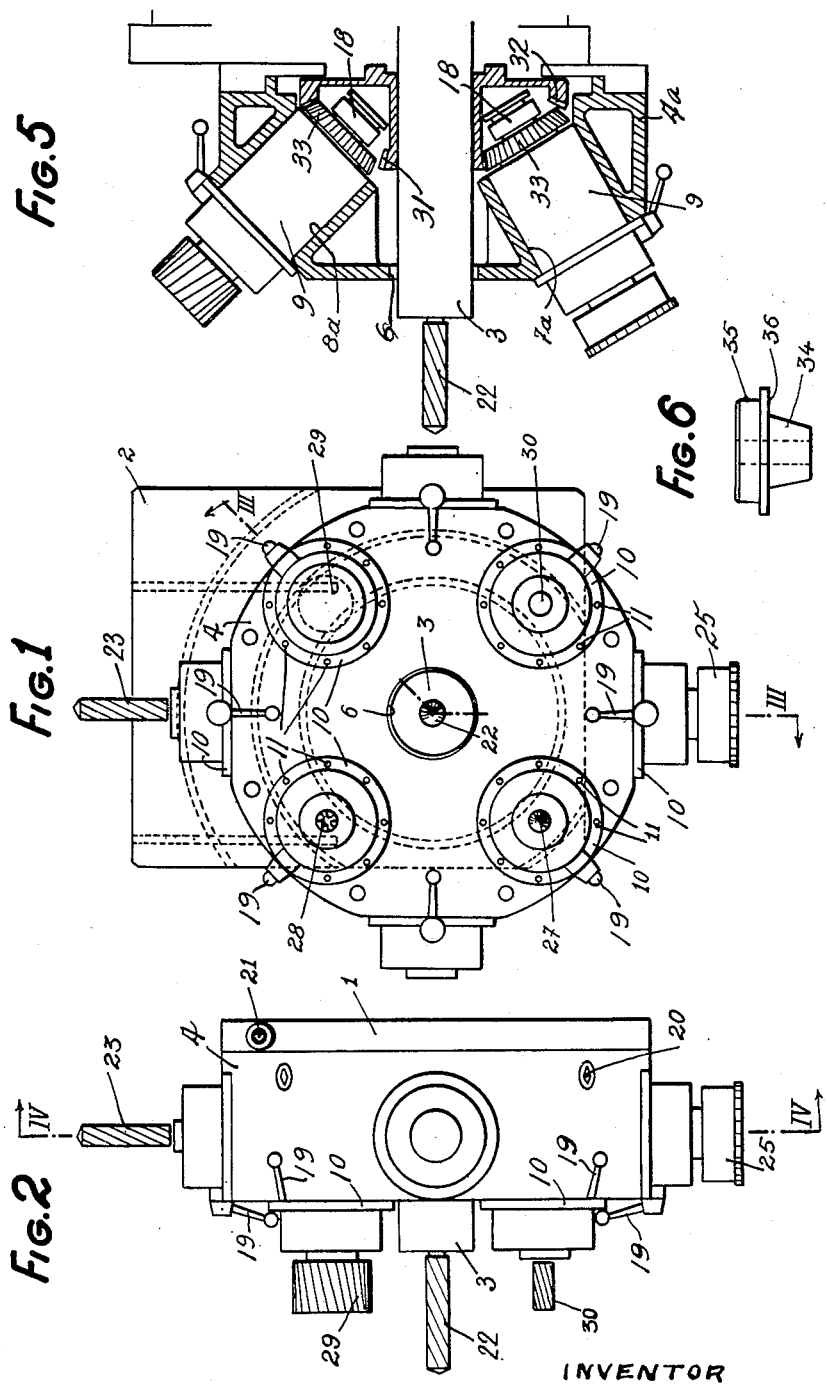
INVENTOR
Charles William Berthiez
By George W. Sorey
ATTORNEY July 6, 1954  C. W. BERTHIEZ  2,682,698
AUXILIARY TOOL HEAD ADAPTABLE TO MILLING AND
BORING MACHINES OR LIKE MACHINE TOOLS
Filed Dec. 9, 1949                           2 Sheets-Sheet 2
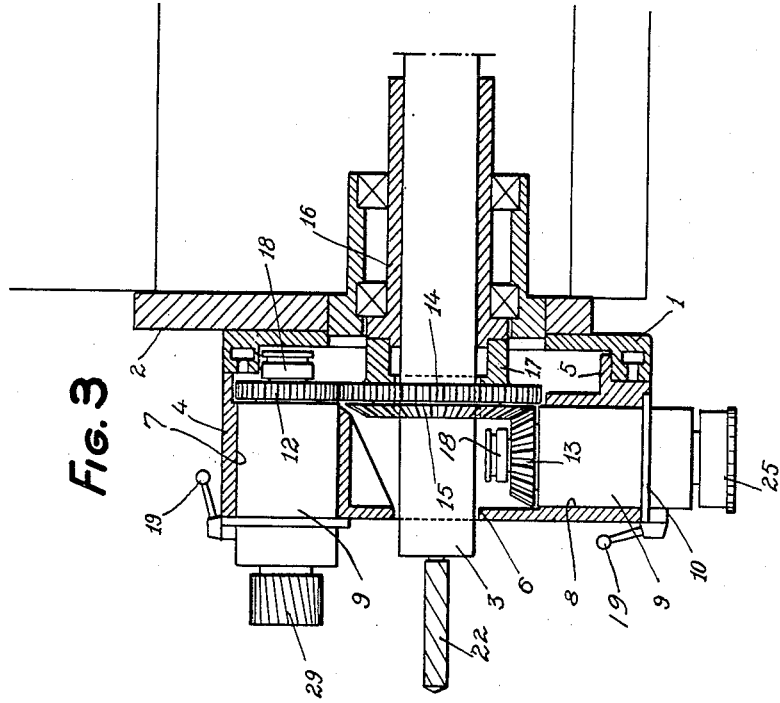
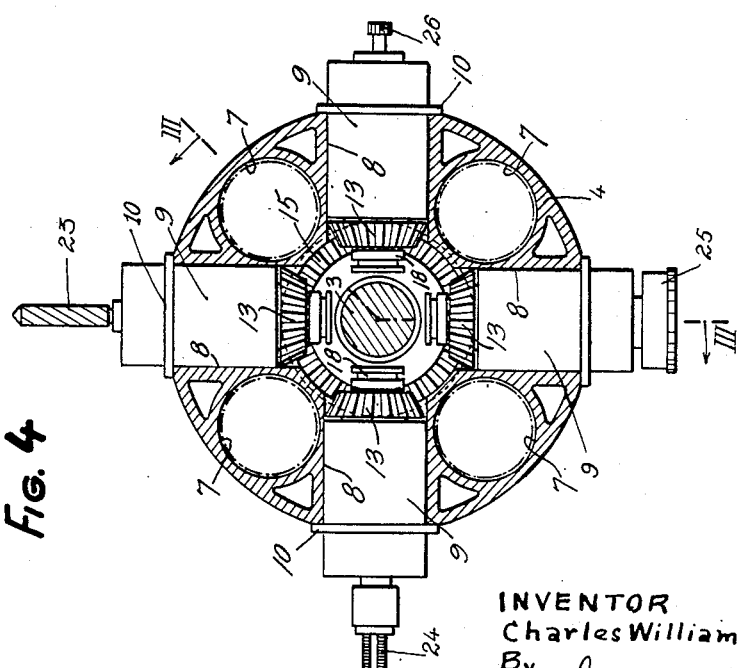
INVENTOR
Charles William Berthiez
By George H. Corey
ATTORNEY Patented July 6, 1954

2,682,698

UNITED STATES PATENT OFFICE 2,682,698

AUXILIARY TOOL HEAD ADAPTABLE TO MILLING AND BORING MACHINES OR LIKE MACHINE TOOLS

Charles William Berthiez, Paris, France

Application December 9, 1949, Serial No. 132,023

Claims priority, application France
December 14, 1948

13 Claims. (Cl. 29—40)

It is known to mount auxiliary tool heads on the headstock of a milling and boring machine for performing operations such as milling, drilling, tapping, etc. These auxiliary tool-heads are driven from the rotary spindle of the machine through a coupling which is automatically engaged when the auxiliary tool-head is mounted on the headstock.

However, before mounting such auxiliary tool-heads it is necessary to remove the tools or tool-holders mounted on the boring spindle of the machine, such as drill, cutter, boring-bar etc. Furthermore the spindle has to be retracted to make it flush with the end surface of the headstock so that it does not interfere with the auxiliary tool-head. Also, it is impossible to use the spindle when the auxiliary tool-head is mounted in its working position.

One object of the present invention is to overcome the above described difficulties.

An auxiliary tool-head according to the invention comprises a body adapted to be secured to the headstock of a boring machine-tool and provided with an opening larger than the cross section of the spindle of the machine and coaxial with said spindle to permit the spindle to project through the opening when the auxiliary tool-head is in place on the headstock of the machine.

According to another feature of the invention, the auxiliary tool-head comprises a unit carrying a rotatable tool and means whereby the tool rotation may be effected from the spindle of the boring machine. A plurality of units may be provided which are interchangeable with each other so that any unit may be received in a recess provided in the auxiliary tool-head.

According to a further feature of the invention, the auxiliary tool-head is of the turret type having, in addition to the aforesaid opening or bore for passing the spindle therethrough, a plurality of recesses adapted to receive rotary tool-units or stationary tools.

Other features of the invention will become apparent from the following description with reference to the accompanying drawings showing in a diagrammatical manner and solely by way of example some embodiments of the invention.

In the drawings:

Fig. 1 is a front view of an auxiliary tool-head according to the invention;

Fig. 2 is a side view of same;

Fig. 3 is a sectional view along line III—III of Fig. 1;

Fig. 4 is a sectional view along line IV—IV of Fig. 2;

Fig. 5 is a sectional view similar to Fig. 3 of a modified embodiment, and

Fig. 6 is a turning tool holder to be mounted on the auxiliary tool-head of Figs. 1–5.

Referring to Figs. 1–4, 1 is a circular base plate mounted on the front face 2 of the headstock of a milling and boring machine concentrically to the spindle 3. On this base plate 1 is mounted a cylindrical body 4 centered by means of a cylindrical flange 5 of smaller diameter. A bore or opening 6 is provided in the axial portion of the body 4 with a diameter sufficient to permit the machine spindle 3 to pass therethrough. The body 4 further comprises a number of cylindrical recesses 7 (four recesses being provided in the embodiment shown) parallel to the spindle axis. Between any two of these recesses another cylindrical recess 8 is provided to form a series of recesses of the same size but positioned at right angles to the spindle axis.

In each of the aforementioned recesses a working unit 9 of any design may be mounted for various machining operations such as milling, drilling, tapping, boring, etc. All these various units have the same diameter and may be fastened in a thoroughly satisfactory manner in the body 4 by means of circular flanges 10 integral with each unit and securing screws 11, Fig. 1, passing through said flanges and fitting into corresponding tappings provided in the body 4.

Each of these various working units is provided with a driving means comprising a standard toothed wheel such as a spur gear 12 when the unit 9 is fitted in a recess parallel to the spindle axis, or a bevel-gear 13 when the unit 9 is fitted radially of said axis. These toothed wheels are adapted for meshing engagement with a spur gear 14 or a bevel-gear 15 according to the position of the unit 9 concerned in relation to the spindle axis, these toothed wheels 14, 15 being fitted on the driving sleeve 16 of the machine spindle 3 by means of a collar piece 17 integral with the aforesaid toothed wheels.

Each unit 9 is provided with a clutch means 18 whereby said unit may be powered or not, according to the position of a manually-controlled lever 19. Each working unit has its individual feed system along the axis of the unit 9.

Finally, the body 4 may be clamped in position on the base plate 1 through any suitable means (not shown) which may be controlled by rotatable elements having square-sectioned sockets 20 (Fig. 2) while rotary movements of the body 4 in the plane of the base plate 1 may be obtained by means of a device (not shown) which may be composed of a worm mounted for rotation within the base plate and controlled from the outside by means having a square sectioned socket 21 (see Fig. 2), the worm meshing with a peripheral toothed ring integral with the body 4.

The above described apparatus operates as follows:

When rotary motion is applied to the sleeve 16 of the spindle 3 it is transmitted through gears 12, 14 and 13, 15 in meshing engagement to the selected unit or units 9 by simply actuating the clutch means 18 by means of the corresponding manually controlled levers 19. When the operation with one of the units 9 is completed another unit 9 may be brought into operation. To this end it will be sufficient to unclamp the body 4 by engaging a key into the square socket 20 and cause the body to rotate by engaging a turning key into the other square socket 21.

It will be seen that the device described makes it possible to use the machine spindle 3 without removing the units 9 by merely bringing the spindle 3 out of the auxiliary head through the opening 6 of the body 4.

It has been assumed, in the example illustrated in Figs. 1–4, that a drill 22 had previously been mounted on the machine spindle while the spindles of the four working units fitted in the radial recesses 8 were fitted with a drill 23, tap 24, a face-cutter 25 and a slot-cutter 26, respectively. The arrangement shown comprises also, by way of example, on the spindles of the units 9 mounted in the recesses 7 a drill 27, a tap 28 and two cutters 29 and 30, respectively. Of course, the tools described above are given merely by way of examples, it being understood that they may be replaced with any other suitable tools adapted for the particular kind of operation or operations which it is desired to perform with the machine. It will be thus apparent that the auxiliary tool-head described hereinabove may be adapted to a wide range of different applications. Thus, it will be seen in Fig. 5 how a body 4a similar to the body 4 of Figs. 1–4 may be provided with recesses 7a—8a having their axes inclined in relation to the machine spindle axis in order to permit obliquely directed operations. To ensure the operating drive of the units 9 fitted into these oblique recesses, it will be sufficient only to provide bevel-gears 31, 32 on the spindle sleeve 16 and bevel-gears 33 adapted to mesh therewith on the respective shafts of the units 9. In the example shown in Fig. 5 it has been assumed that the axes of the recesses 7a—8a were set at a different inclination, respectively, which explains the provision of a set of two differently inclined bevel-gears 31 and 32 on the sleeve 16 of the machine spindle. Of course, it will be apparent that if the inclination of the recesses were the same, a single bevel-gear would be sufficient on the sleeve 16.

It will be understood that the invention is not restricted to the particular embodiments thereof shown and described in the present application by way of example; thus any desired number of unit receiving recesses may be provided or even a single recess only if desired.

Finally, the rotary units illustrated and described could be replaced with simple fixed tool-holder units such as for example the tool-holder 34 shown in Fig. 6. In this case, the cylindrical portion 35 of the tool-holder would have the same diameter as the body of the unit 9 and the securing flange 36 of the same dimension as the securing flange 10 of the aforesaid working units. This fixed tool-holder could be used for instance for turning operations on a machine of the type described and shown in my co-pending application Serial No. 121,941 filed on October 18, 1949, relative to "Universal Machine-Tool." In this machine the headstock is slidably movable parallel to the axis of the spindle. The tools which could be mounted in the tool-holder 34 may be of widely differing types according to the kind of work to be performed which is the reason why these tools have not been shown in the drawing. The tool-holder 34 may be provided, if necessary, with a feed imparting arrangement.

What I claim is:

1. An auxiliary tool head for a milling and boring machine or the like having a headstock supporting a spindle for rotation of said spindle on its axis and for movement of said spindle parallel to the axis thereof relative to said headstock to different positions projecting beyond said headstock for boring and milling operations, said headstock being supported for movement thereof parallel to said spindle axis, said auxiliary tool head comprising a body having a form capable of being supported on said headstock adjacent said spindle and of extending circumferentially about said spindle to provide an opening through said body for said spindle in said movement thereof parallel to the axis thereof to pass through said opening unobstructed by said body, said body having a recess therein in offset relation to said spindle transversely of the axis thereof and outwardly of the circumferential surface of said spindle when said body is supported on said headstock, a member supported in said recess and supporting an auxiliary tool for movement of said auxiliary tool relative to said member for a cutting operation on a workpiece disposed adjacent said auxiliary tool head, and means supported by said body and operatively connected to said auxiliary tool and operable for effecting said cutting movement of said auxiliary tool.

2. An auxiliary tool head as defined in claim 1 in which said means operatively connected to said auxiliary tool and operable for effecting cutting movement of said auxiliary tool comprises a shaft supported by said member for rotation thereof and adapted to carry said auxiliary cutting tool, and means supported by said body and operatively connected to said shaft and operable for rotatably driving said shaft.

3. An auxiliary tool head as defined in claim 2 in which said means for driving said shaft comprises means operatively connectible to said spindle of said machine for effecting rotation of said shaft upon rotation of said spindle when said auxiliary tool head is supported on said headstock.

4. An auxiliary tool head for a milling and boring machine or the like having a headstock supporting a spindle for rotation of said spindle on its axis and for movement of said spindle parallel to the axis thereof relative to said headstock to different positions projecting beyond said headstock for boring and milling operations, said headstock being supported for movement thereof parallel to said spindle axis, said auxiliary tool head comprising a body having a form capable of being supported on said headstock adjacent said spindle for pivotal movement of said body on the axis of said spindle to different angularly related positions, said body extending circumferentially about said spindle to provide an opening through said body in alignment with said spindle when said body is supported on said headstock, said opening being larger than the cross section of said spindle to provide for said movement of said spindle parallel to the axis thereof through said opening unobstructed by said body in any position to which said body is pivotally moved, said body providing a plurality of recesses therein disposed in spaced relation about and outwardly of said opening in said body, each of said recesses being formed interchangeably to receive a member insertable therein for supporting an auxiliary tool to position said auxiliary tool in offset relation to said spindle transversely of the axis thereof for a cutting operation on a workpiece disposed adjacent said auxiliary tool head.

5. An auxiliary tool as defined in claim 4 in which said recesses are of cylindrical form and are disposed with the axes thereof in planes containing the axis of said spindle.

6. An auxiliary tool head as defined in claim 5 in which said axes of said recesses extend perpendicular to the axis of said spindle.

7. An auxiliary tool as defined in claim 5 in which said axes of said recesses are parallel to the axis of the spindle.

8. An auxiliary tool head as defined in claim 5 in which the axes of said recesses are inclined relative to the axis of said spindle.

9. An auxiliary tool head for a milling and boring machine or the like having a headstock supporting a spindle for rotation of said spindle on its axis and for movement of said spindle parallel to the axis thereof relative to said headstock to different positions projecting beyond said headstock for boring and milling operations, said headstock being supported for movement thereof parallel to said spindle axis, said auxiliary tool head comprising a body having a form capable of being supported on said headstock adjacent said spindle for pivotal movement of said body on the axis of said spindle to different angularly related positions, said body extending circumferentially about said spindle and having an opening therethrough in alignment with said spindle when said body is supported on said headstock, said opening being larger than the cross section of said spindle to provide for said movement of said spindle parallel to the axis thereof through said opening unobstructed by said body in any position to which said body is pivotally moved, and means for supporting an auxiliary tool on said body in offset relation to said spindle outwardly of the circumferential surface of said spindle to provide for said unobstructed movement of said spindle and for effecting a cutting operation of said auxiliary tool on a workpiece disposed adjacent said auxiliary tool head.

10. An auxiliary tool head for a milling and boring machine or the like having a headstock supporting a spindle for rotation of said spindle upon its axis and for movement of said spindle parallel to the axis thereof relative to said headstock to different positions projecting beyond said headstock for boring and milling operations, said headstock being supported for movement thereof parallel to said spindle axis, said auxiliary tool head comprising a base plate having a form capable of being secured to said headstock adjacent said spindle upon a face of said headstock extending transversely of the axis of said spindle, a body carried by said base plate so as to provide for pivotal movement of said body on said base plate on the axis of said spindle to different angularly related positions when said plate is secured to said headstock, said base plate and said body each having an opening therethrough in alignment with said spindle when said base plate carrying said body is secured to said headstock, said openings being larger than the cross section of said spindle to provide for said movement of said spindle parallel to the axis thereof unobstructed by said plate and said body in any position of said body to which it is pivotally moved, and means supporting an auxiliary tool on said body in offset relation to said spindle outwardly of the circumferential surface of said spindle to provide for said unobstructed movement of said spindle and for effecting a cutting operation of said auxiliary tool on a workpiece disposed adjacent said auxiliary tool head.

11. An auxiliary tool head as defined in claim 9 in which said means for supporting said auxiliary tool is adapted to secure said auxiliary tool in fixed relation to said body.

12. In a milling and boring machine or the like having a headstock supporting a spindle for rotation of said spindle on its axis and for movement of said spindle parallel to the axis thereof relative to said headstock to different positions projecting beyond said headstock for boring and milling operations, said headstock being supported for movement thereof parallel to said spindle axis, the combination with said headstock and said spindle of an auxiliary tool head comprising a body supported on said headstock adjacent said spindle and extending about said spindle to provide space for said movement of said spindle parallel to the axis thereof unobstructed by said body, and means for supporting an auxiliary tool on said body in offset relation to said spindle outwardly thereof transversely of the axis thereof to provide for said unobstructed movement of said spindle and for effecting a cutting operation on a workpiece disposed adjacent said auxiliary tool head.

13. An auxiliary tool head for a milling and boring machine or the like having a member supporting a spindle for rotation of said spindle on its axis and for movement of said spindle parallel to the axis thereof relative to said member to different positions projecting beyond said member for boring and milling operations, said spindle supporting member being supported for movement thereof parallel to said spindle axis, said auxiliary tool head comprising a body having a form capable of being supported on said spindle supporting member adjacent said spindle and of extending circumferentially about said spindle to provide an opening through said body for said spindle in said movement thereof parallel to the axis thereof to pass through said opening unobstructed by said body, means supporting an auxiliary tool on said body in offset relation to said spindle transversely of the axis thereof and outwardly of the circumferential surface of said spindle when such body is supported on said member for movement of said auxiliary tool relative to said body for a cutting operation on a workpiece disposed adjacent said auxiliary tool head, and means supported by said body and operatively connecting to said auxiliary tool and operable for effecting said cutting movement of said auxiliary tool.

References Cited in the file of this patent

UNITED STATES PATENTS

| Number | Name | Date |
| --- | --- | --- |
| 1,602,243 | Nagle | Oct. 5, 1926 |
| 1,724,250 | Berven | Aug. 13, 1929 |
| 1,878,656 | Adams | Sept. 20, 1932 |
| 2,359,161 | Seates | Sept. 26, 1944 |
| 2,435,354 | Hotchkiss | Feb. 3, 1948 |
| 2,456,245 | Burke | Dec. 14, 1948 |
| 2,509,635 | Gloton | May 30, 1950 |
| 2,556,601 | Schofield | June 12, 1951 |